United States Patent [19]
Millington

[54] NAVIGATION SYSTEM WITH ALL CHARACTER SUPPORT

[75] Inventor: Jeffrey Alan Millington, Rochester Hills, MI (US)

[73] Assignee: Magellan, DIS, Inc., Rochester Hills, MI (US)

[ * ] Notice: Subject to any disclaimer, the term of this patent is extended or adjusted under 35 U.S.C. 154(b) by 0 days.

This patent is subject to a terminal disclaimer.

[21] Appl. No.: 09/470,438

[22] Filed: Dec. 22, 1999

Related U.S. Application Data

[63] Continuation-in-part of application No. 09/037,772, filed on Mar. 10, 1998.

[51] Int. Cl.[7] ........................................... G06F 3/00
[52] U.S. Cl. ............................... 345/353; 345/357
[58] Field of Search ........................ 345/353, 354, 345/352, 356, 357

[56] References Cited

U.S. PATENT DOCUMENTS

| 5,263,174 | * | 11/1993 | Layman | 345/353 |
| 5,661,476 | * | 8/1997 | Wang et al. | 341/22 |
| 5,689,667 | * | 11/1997 | Kurtenbach | 345/352 |
| 5,706,448 | * | 1/1998 | Blades | 345/326 |
| 5,805,167 | * | 9/1998 | Van Cruyningen | 345/353 |
| 5,929,857 | * | 7/1999 | Dinallo et al. | 345/354 |
| 6,037,942 | * | 3/2000 | Millington | 345/353 |

* cited by examiner

Primary Examiner—Raymond J. Bayerl
Assistant Examiner—Sy D. Luu
(74) Attorney, Agent, or Firm—Carlson, Gaskey & Olds, P.C.

(57) ABSTRACT

A graphical user interface includes a display having several groups of symbols with each group arranged in a unique pre-determined direction relative to a start position. A user manipulatable directional input device permits a user to select any one of the groups with a single keystroke. Once a group has been selected, the directional input device permits a user to activate any one of the symbols within a group with a single keystroke. If a group does not contains the symbol desired by the user, the user sends a selection signal from the directional input device so that group displays a second plurality of symbols. Preferably, a sequence of the plurality of symbols are shown at a first group, each transmission of the selection signal displaying the next plurality of symbols until the originally displayed first plurality of symbols are again displayed in the first group. Any number of symbols can thus be displayed in a limited viewable area of the first group while maintaining the same selection methodology.

7 Claims, 2 Drawing Sheets

NAVIGATION SYSTEM WITH ALL CHARACTER SUPPORT

This is a Continuation-in-Part of U.S. patent application Ser. No. 09/037,772 Filed Mar. 10, 1998 pending.

BACKGROUND OF THE INVENTION

This invention generally relates to navigation or route guidance systems and, more particularly, to a graphical user interface having improved access to multiple information screens for a route guidance system.

Navigation systems generally provide a recommended route from a starting point to a desired destination. Generally, the starting point and desired destination are selected from a large database of roads stored in a mass media storage, such as a CD ROM, which includes the roads in the area to be traveled by the user. The navigation system can be located in a personal computer or it can be installed in a vehicle. If the navigation system is installed in a vehicle, the starting point is typically the current position of the vehicle, which can be input to the navigation system by an associated position determining system that usually includes a GPS (Global Positioning System) receiver.

The navigation system determines a route from the starting point to the destination utilizing an algorithm well known to those in the art and currently in use in many navigation systems. Usually there are many potential routes between the selected starting point and the desired destination. Typical navigation systems select a recommended route based upon certain "cost" values associated with each segment of road in the road database. These cost values include the length of the road segment and the estimated time of travel through the road segment. The navigation system selects the potential route with the lowest total cost to be the recommended route. Depending upon the predetermined algorithm of the navigation system, the navigation system will recommend the route with the shortest total length, the lowest total time, or some weighted average of length and time.

The recommended route is then displayed to the user as a map showing the starting point and desired destination and highlighting the recommended route. Preferably, if the navigation system is installed in a vehicle, the navigation system displays the current position of the vehicle and provides turn-by-turn instructions to the driver, guiding the driver to the selected destination.

Navigation systems typically include a graphical user interface that allows a user to input the desired destination. For example, the user must input a city name for the desired destination. Since a full keyboard is impractical in a vehicle, the typical graphical user interface includes a directional input device such as a four-way button. The user is presented with the letters of the alphabet arranged in a single large rectangular array. The typical system requires the user to scroll through the alphabet one letter at a time using the directional input device, selecting a desired letter when it becomes highlighted. These systems have the disadvantage of requiring a large number of key strokes to input a given letter and the city name. Such systems can also be very time consuming and frustrating for a user. Further, with the viewable area limited by the screen size, the displayed characters are commonly limited to only those that are essential.

Thus, it is desirable to provide a graphical user interface and a method that permits a user to rapidly select one character from a large array of characters using a simple input device. It is furthermore desirable to provide a graphical user interface that allows access to any number of characters without increasing the display size and with only a minimal number of keystrokes.

SUMMARY OF THE INVENTION

In general terms, this invention provides a unique arrangement of characters in combination with a directional input device which allows a user to select one character from a large array of characters while allowing an unlimited number of symbols to be displayed.

The graphical user interface generally includes a display device and a directional input device that is manipulatable by a user. The display device displays a plurality of groups arranged adjacent a start position. Each group is located in a unique predetermined direction relative to the start position. Each group further includes a plurality of symbols that are arranged adjacent a central position in the group. The directional input device is connected to the display device and is capable of transmitting a selection signal and a plurality of output signals, each of which is associated with one of the unique predetermined directions. Each of the groups is activated in response to one of the output signals. In addition, each symbol within an activated group is also activated in response to one of the output signals. An activated symbol can be selected by the user in response to the selection signal.

If the symbol the user desires to input is not displayed, the user actuates a first group. A first symbol of the first group such as "More", is thereby activated. If the first group does not contains the symbol desired by the user, the user sends a selection signal from the directional input device to the display device. The first symbol "More" is thereby selected.

The first group will now display a second plurality of symbols. The first symbol of the first group, continues to occupy the first position of the group. If the user still does not see the desired symbol the user continues to send a selection signal from the directional input device until the desired symbol is displayed. Preferably, a sequence of the plurality of symbols are shown at the first group, each transmission of the selection signal displaying the next plurality of symbols until the originally displayed first plurality of symbols are again displayed in the first group.

Once the desired symbol is displayed in the first group, the user selectively keys the directional arrows to move the directional input device and thereby sends a second directional signal to the display device. The symbol located in the direction associated with the second directional signal is then activated. If the user then sends a selection signal, the activated symbol is selected. Any number of symbols can thus be displayed in a limited viewable area of the first group while maintaining the selection methodology.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
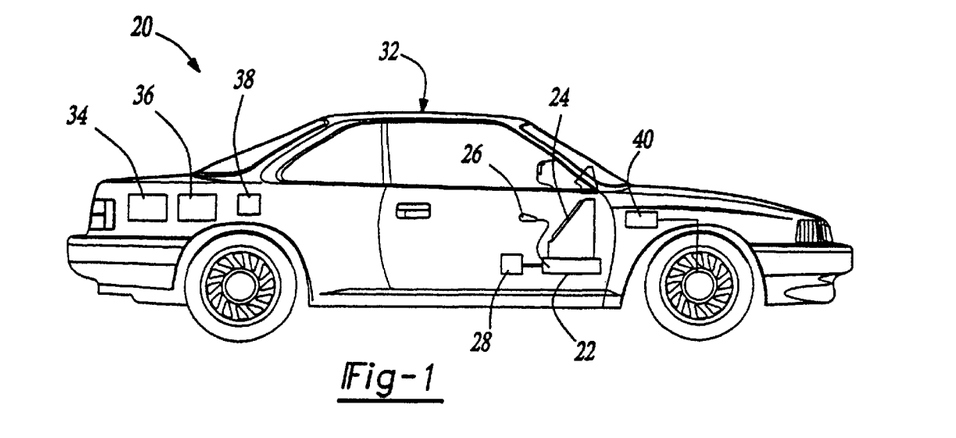
FIG. 1 is a schematic of a navigation system with the graphical user interface of the present invention installed in a vehicle.

The navigation system 20 of the present invention is shown schematically in FIG. 1. The navigation system 20 includes a CPU 22 (Central Processing Unit) connected to a display device 24 and a directional input device 26 attached to the vehicle interior by a bracket 27, or the like. The navigation system 20 further includes a database 28 connected to the CPU 22. The database 28 is a mass media storage device, such as a CD-ROM, hard drive, DVD, RAM, ROM or the like which includes a map of all the roads in the area to be traveled by the user. Each road in the database is divided into road segments, each having an associated set of cost values, which indicate the "cost" of traveling that road segment. For example, the cost values may include the length of the road segment, the estimated time to travel the road segment, and the type of road (i. e., highway, secondary road, toll road, one way, etc.).

The navigation system 20 can, but need not, be installed in a vehicle 32. The navigation system can be used in conjunction with position determining devices, such as a GPS receiver 34 and a multi-axis accelerometer 35. Navigation system 20 could alternatively or additionally include a gyroscope 36, a compass 38, and a wheel speed sensor 40, all connected to the CPU 22 (connections not shown for simplicity). Preferably, a combination of these position determining devices is utilized to assure accurate location.

Figure 2:
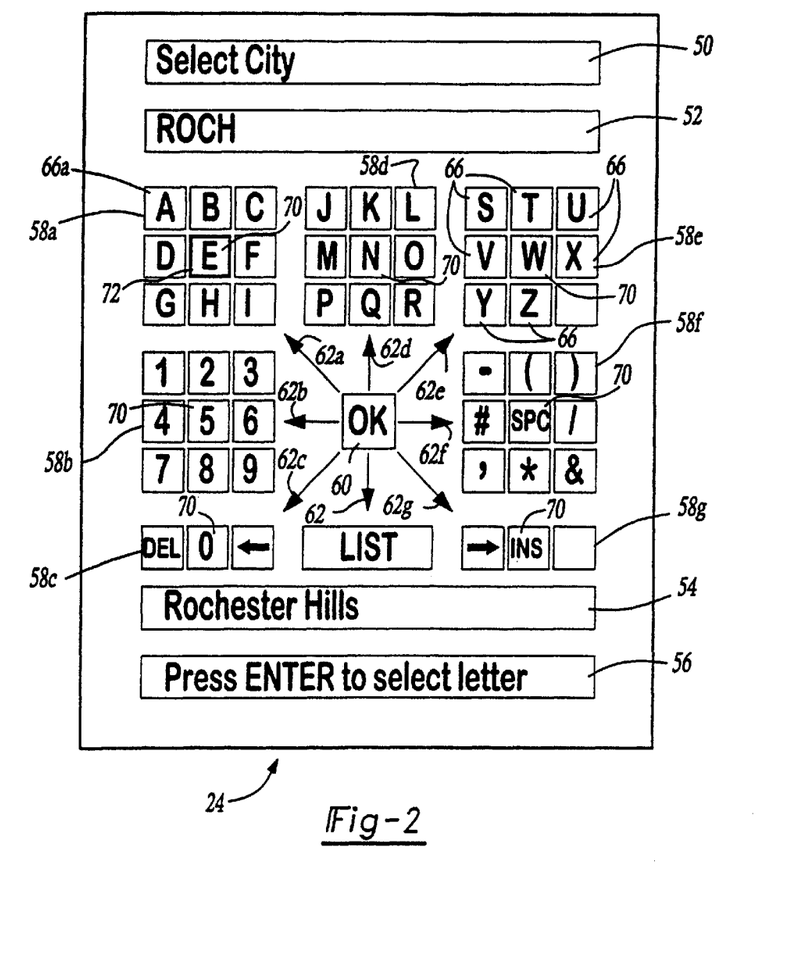
FIG. 2 is a plan view of a display device having an eight way button which could be used as the directional input device in FIG. 1.

FIG. 2 is a perspective view of one disclosed embodiment of the display device 24 and directional input device 26, preferably designed as an integral unit attached to the CPU by connection 25. The display device 24 includes a screen such as a high resolution LCD or flat panel display. The directional input device 26 includes a multiple of input buttons 78 including, preferably, an eight-way button shown generally at 80 and a selection key 86 such as an "Enter" key. Although an eight-way button is shown, it will be realized that other input devices, such as a joystick, mouse or roller ball can be employed.

The internal disk 82 is pivotally mounted in the eight-way button 80 and is capable of moving in the direction of any one of the directional arrows 84. Movement of the internal disk 82 in the direction of one of the directional arrows 84 transmits a directional signal.

Figure 3:
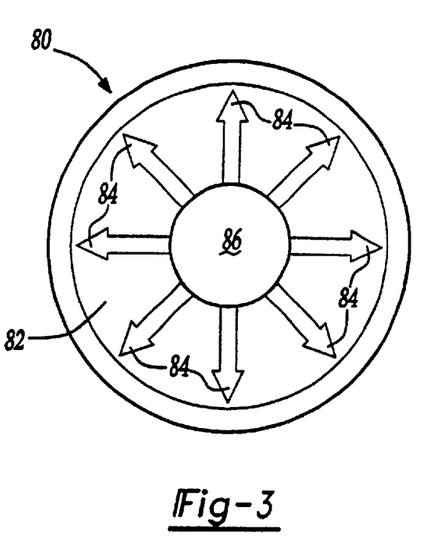
FIG. 3 is a screen display of an embodiment of the graphical user interface of the present invention illustrating a first plurality of characters.

FIG. 3 is a screen display of an embodiment of the graphical user interface including a category field 50 that displays a user selected category of information. The disclosed embodiment illustrates the category 50 of "Select Destination City". The display device 24 further includes a type field 52 that can include a look ahead function, and an instructional field 56. Pluralities of groups 58a through 58e are arranged adjacent a start position 60. Each of the pre-determined directions 62 are shown on the display device 24. The pre-determined directions 62 correspond to the plurality of directional arrows 84 on the eight-way button 80 (FIG. 2). Corresponding the pre-determined directions 62 with the plurality of directional arrows 84 provides an intuitive input to an operator.

Each group 58 is located at a unique, pre-determined direction 62a through 62e relative to the start position 60. Each group 58b, c, d, e, includes a plurality of symbols 66.

The symbols 66 in each group 58b, c, d, e are arranged around a first symbol 70 that is, preferably, the central position.

A first group 58a is located in a lower left direction relative to the start position 60. The first group 58a includes a first plurality of symbols 66a, such as "<", ">", "=", "?", and "Space". Preferably, the first symbol 70a of the first group 58a occupies the lower position of the group and includes a descriptive operative term such as "More".

Figure 4:
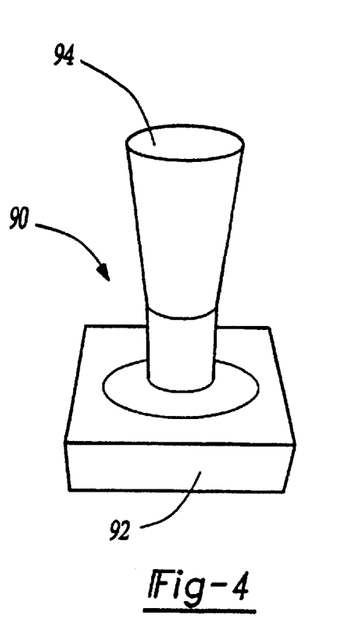
FIG. 4 is a screen display of the embodiment of FIG. 3 illustrating a second plurality of characters.

In FIGS. 3 and 4, the first symbol 70a of the first group 58a, "More" in the disclosed embodiment is shown as activated. Although the "More" is illustrated as being activated, any symbol 70 is preferably selected by pressing the selection or "Enter" key 86 (FIG. 2). An "activated" symbol 66 or the start position 70a may be indicated by a change in color, a brightening, an outline, flashing, or other known instructive markings.

Preferably, the display device 24 only activates symbols 66 that can be selected by the user based on the category of information selected. After a user has selected a category of information, for instance Select Destination City, the display device 24 displays a screen similar to that shown in FIG. 3. In the category field 50 will be displayed the category of information. Initially, the type field 52 can be blank and the start position 60 is activated.

Alternatively, the first City in the Select Destination City database 28, for example only, "Aaron" could be displayed in the type field 52. If the user then sends a selection signal from the directional input device 26, "Aaron" will be selected.

Preferably, only enabled symbols can be activated and disabled symbols can not be activated. In this embodiment, the CPU 22 also includes a filter. The filter in conjunction with a comparator determines which of the symbols 66 will be enabled symbols 128 based on the list of pre-arranged symbol sequences in the database 28. By way of illustration only, assume that the user has selected the symbol the letter "A" in the address book function. Then only city names available in the database 28 that begin with the letter "A" will be activated. For example only, "Aaron", "Alpha", "Alto", and "Amy." After the user has selected the symbol 66 for the letter "A," the comparator in conjunction with the CPU 22 determines that the four possible cities that begin with the letter "A" consist of "Aaron" "Allen", "Alto", and "Amy." The city Aaron will be displayed in the type field 52 with a cursor located adjacent to the letter "A", for example, "A|aron". The filter will then enable the symbols 66 "A", "L", and "M" and will deactivate all the other symbols 66. A user will not be able to select any disabled symbol and may only select the enabled symbols 128. If the user then selects the letter "L" as the second symbol 66, the letters "A" and "M" will be converted by the filter into a disabled symbol and the letters "P" and "T" will be converted from disabled symbols 132 into enabled symbols 128. If the user then selects enabled symbol 66 "T" the only single matching pre-arranged symbol sequence in the list in the database 28 is "Alto". The filter in conjunction with the CPU 22 will automatically fill in the rest of the symbols 66 to complete the single available pre-arranged symbol sequence from the list. Likewise, if the user had selected enabled symbol 66 "P" the filter in conjunction with the CPU 22 would automatically select the only possible matching pre-arranged symbol sequence of the city name "Alpha."

The graphical user interface of this embodiment includes the further feature that if a user deletes a previously selected symbol 66 at a point where the filter determines that there are more than one possible enabled symbol 66, then the filter will re-enable the symbols 66 that are possible enabled symbols 66. By way of illustration, if the user had selected, in order, the sequence of symbols 66 of "AL," then the letters "P" and "T" would be enabled symbols 66. If the user then deleted the symbol 66 "L," the filter would convert the symbols 66 "L" and "M" into enabled symbols.

An additional feature of the graphical user interface is that they include a group wrap feature. This feature operates in the following manner. Beginning from the start position 60, a user sends a first directional signal and activates the central position 70 of a group 58. The user then sends a second directional signal activating one of the symbols 66 not found in the central position 70 of a group 58. If the user then sends a third directional signal and the third directional signal is in the direction of a group 58 that is adjacent to the activated symbol 66, either physically on the display device 24 or via a wrap, then the central position 70 of that adjacent group 58 is activated.

FIG. 4 is a screen display of the graphical user interface of FIG. 3 after the first symbol 70a of the first group 58a has been selected. As shown, the first group 58a now includes a second plurality of symbols 66a', such as "/", "@", ":", "$", "Space". The first symbol 70a of the first group 58a, such as "More", continues to occupy the lower position of the group. As will be further described below, by continuing to select the first symbol 70a of the first group 58a, an entire sequence of symbols are displayed at the first group 58a. Thus, while each group 58b, c, d, e, are available to display the most commonly used alphabetic and numeric symbols, the first group 58a is available to display any other symbol. Any number of symbols can thus be displayed in a limited viewable area.

By way of illustration, the method of the present invention and use of the graphical user interface shown in FIGS. 3 and 4 will be described, as it would be used to select characters. For further understanding of other aspects of the present invention attention should be referred to co-pending U.S. patent application Ser. No. 09/037,772 Filed Mar. 10, 1998 which is incorporated herein in its entirety.

To select a symbol from the group 58b, c, d, e, a user selects a symbol by selectively keying the directional arrows 84 on the eight-way button 80 (FIG. 2) to move the directional input device 26 in a pre-determined direction 62 associated with the group 58 containing the desired symbol. This sends a first directional signal from the directional input device 26 to the display device 24. The central position 70 of the group 58 located in the pre-determined direction 62 is then activated. Activation of the central position 70 activates the group 58. If the user wishes to select the symbol 66 located at the central position 70 of the activated group 58, the user sends a selection signal from the directional input device 26 to the display device 24 such as by placing pressure on the "Enter" key 86 or by keying one of the input buttons 78. The selected symbol 66 is then displayed in the type field 52.

If the user does not wish to select the symbol 66 located at the central position 70, then the user selectively keys the directional arrows 84 on the eight-way button 80 (FIG. 2) to move the directional input device 26 in one of the pre-determined directions 62 and thereby sends a second directional signal to the display device 24. The symbol 66 located in the direction relative to the central position 70 associated with the second directional signal is then activated. If the user then sends a selection signal, the activated symbol 66 is selected and is displayed in the type field 52.

If the user desires to select a displayed character from the first plurality of symbols 66a, such as "<", ">", "=", "?", and "Space" in the group 58a, the user follows the procedure described above. However, if symbol the user desires to input is not displayed, the user would select group 58a, again by selectively keying the directional arrows 84 on the eight-way button 80. In this example, arrow 84a (FIG. 2) would be selected to move the directional input device 26 in the pre-determined direction 62a associated with the group 58a. This sends a first directional signal from the directional input device 26 to the display device 24. The first symbol 70a of the first group 58a, "More", is thereby activated. Activation of the first symbol 70a activates the group 58a. Although the first symbol 70a in this disclosed embodiment is the "More" symbol, it will should be understood that any other symbol in the first group 58a, such as the "Space" symbol, could be the first symbol 70a.

If the first group 58a does not contains the symbol desired by the user, the user sends a selection signal from the directional input device 26 to the display device 24. The first symbol 70a of the first group 58a, "More", is thereby selected.

As a result of selecting the "More" first symbol 70a, the first group 58a now displays the second plurality of symbols 66a', such as "/", "@", ":", "$", and "Space", as shown in FIG. 4. The first symbol 70a of the first group 58a, such as "More", continues to occupy the lower position of the group. If the user still does not see the desired symbol the user continues to send a selection signal from the directional input device 26 to the display device 24 until the desired symbol is displayed by the first group 58. Preferably, a sequence of the plurality of symbols are shown at the first group 58a, each transmission of the selection signal displaying the next plurality of symbols until the originally displayed first plurality of symbols 66a, (FIG. 3) are again displayed in the first group 58a.

Once the desired symbol is displayed in the first group 58a, the user selectively keys the directional arrows 84 to move the directional input device 26 in one of the pre-determined directions 62 and thereby sends a second directional signal to the display device 24. The symbol 66 located in the direction relative to the central position 70 associated with the second directional signal is then activated. If the user then sends a selection signal, the activated symbol 66 is selected and is displayed in the type field 52. Any number of symbols can thus be displayed in a limited viewable area of the first group 58a while maintaining the same selection methodology.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

I claim:

1. An in-vehicle navigation system comprising:
   a database including a plurality of roads, said plurality of roads including a first road;
   a position determining system, said position determining system determining a position of the vehicle relative to said first road;

a graphical user interface for selecting a destination from said database, said interface including a display device and an input device;

said display device displaying a plurality of groups including a first group, each group in a unique pre-determined direction relative to a start position, said first group displaying a first plurality of symbols including a first symbol;

an input device connected to said display device, said input device having a selection signal and a plurality of directional output signals, each of said plurality of output signals associated with one of said plurality of pre-determined directions;

each group activatable in response to one of said plurality of output signals, each symbol within an activated group of said plurality of groups activatable in response to one of said plurality of output signals, an activated symbol selectable in response to said selection signal;

said first symbol activatable in response to one of said plurality of output signals, said display device displaying a second plurality of symbols at said first group in response to said selection signal at said first symbol; and a route determination system, said system determining a route from said position of said vehicle to said destination, said route on said plurality of roads.

2. An in-vehicle navigation system as recited in claim 1 wherein said input device comprises an eight way button.

3. An in-vehicle navigation system as recited in claim 1 wherein said position determining system includes a Global Positioning System receiver.

4. An in-vehicle navigation system as recited in claim 1 wherein said position determining system includes an accelerometer.

5. A graphical user interface as recited in claim 1 wherein said first plurality of symbols includes a "More" symbol.

6. A graphical user interface as recited in claim 1 wherein said first symbol is located at a central position relative to said first plurality of symbols.

7. A graphical user interface as recited in claim 1 wherein said first symbol is said "More" symbol.

* * * * *

UNITED STATES PATENT AND TRADEMARK OFFICE
CERTIFICATE OF CORRECTION

PATENT NO.    : 6,256,029 B1
DATED         : July 3, 2001
INVENTOR(S)   : Millington

It is certified that error appears in the above-identified patent and that said Letters Patent is hereby corrected as shown below:

<u>Title page,</u>
Showing an illustrative figure, shoud be deleted and substitute therefor the attached title page.

<u>Drawings,</u>
Delete drawing sheets 1-3, and substitute therefor the drawing sheets, consisting of Fig. 1-4, as shown on the attached page.

Signed and Sealed this

Eighteenth Day of June, 2002

*Attest:*

*Attesting Officer*

JAMES E. ROGAN
*Director of the United States Patent and Trademark Office*

(12) United States Patent
Millington (10) Patent No.: US 6,256,029 B1
(45) Date of Patent: *Jul. 3, 2001

(54) NAVIGATION SYSTEM WITH ALL CHARACTER SUPPORT (75) Inventor: Jeffrey Alan Millington, Rochester Hills, MI (US)

(73) Assignee: Magellan, DIS, Inc., Rochester Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/470,438

(22) Filed: Dec. 22, 1999

Related U.S. Application Data

(63) Continuation-in-part of application No. 09/037,772, filed on Mar. 10, 1998.

(51) Int. Cl.[7] ............................................ G06F 3/00
(52) U.S. Cl. ................................. 345/353; 345/357
(58) Field of Search .............................. 345/353, 354, 345/352, 356, 357

(56) References Cited

U.S. PATENT DOCUMENTS

| | | | |
|---|---|---|---|
| 5,263,174 | * 11/1993 | Layman | 345/353 |
| 5,661,476 | * 8/1997 | Wang et al. | 341/22 |
| 5,689,667 | * 11/1997 | Kurtenbach | 345/352 |
| 5,706,448 | * 1/1998 | Blades | 345/326 |
| 5,805,167 | * 9/1998 | Van Cruyningen | 345/353 |
| 5,929,857 | * 7/1999 | Dinallo et al. | 345/354 |
| 6,037,942 | * 3/2000 | Millington | 345/353 |

* cited by examiner

Primary Examiner—Raymond J. Bayerl
Assistant Examiner—Sy D. Luu
(74) Attorney, Agent, or Firm—Carlson, Gaskey & Olds, P.C.

(57) ABSTRACT

A graphical user interface includes a display having several groups of symbols with each group arranged in a unique pre-determined direction relative to a start position. A user manipulatable directional input device permits a user to select any one of the groups with a single keystroke. Once a group has been selected, the directional input device permits a user to activate any one of the symbols within a group with a single keystroke. If a group does not contains the symbol desired by the user, the user sends a selection signal from the directional input device so that group displays a second plurality of symbols. Preferably, a sequence of the plurality of symbols are shown at a first group, each transmission of the selection signal displaying the next plurality of symbols until the originally displayed first plurality of symbols are again displayed in the first group. Any number of symbols can thus be displayed in a limited viewable area of the first group while maintaining the same selection methodology.

7 Claims, 2 Drawing Sheets